(12) United States Patent
Yoshimura

(10) Patent No.: US 10,349,025 B2
(45) Date of Patent: Jul. 9, 2019

(54) PROJECTOR AND METHOD OF CONTROLLING PROJECTOR

(71) Applicant: SEIKO EPSON CORPORATION, Tokyo (JP)

(72) Inventor: Jun Yoshimura, Beppu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/034,786

(22) Filed: Jul. 13, 2018

(65) Prior Publication Data

US 2019/0037186 A1 Jan. 31, 2019

(30) Foreign Application Priority Data

Jul. 27, 2017 (JP) ................................. 2017-145191
Apr. 27, 2018 (JP) ................................. 2018-086428

(51) Int. Cl.
| | |
|---|---|
| *H04N 9/31* | (2006.01) |
| *H04N 5/44* | (2011.01) |
| *H04N 5/445* | (2011.01) |
| *G06T 7/13* | (2017.01) |
| *G03B 21/14* | (2006.01) |

(Continued)

(52) U.S. Cl.
CPC ......... *H04N 9/3185* (2013.01); *G03B 21/147* (2013.01); *G06T 7/13* (2017.01); *G06T 7/70* (2017.01); *H04N 5/4403* (2013.01); *H04N 5/445* (2013.01); *H04N 9/3197* (2013.01); *G03B 21/006* (2013.01); *H04N 9/317* (2013.01)

(58) Field of Classification Search
CPC .......... H04N 9/28; H04N 9/31; H04N 9/3185; H04N 9/3197; H04N 9/317; H04N 9/3194; H04N 5/4403; H04N 5/445; G06T 7/13; G06T 7/70; G03B 21/147; G03B 21/006; G03B 21/14; G03B 21/56; G03B 21/60; G03B 21/58
USPC .................. 348/744–747, 759, 806; 353/69; 359/237, 443
See application file for complete search history.

(56) References Cited

U.S. PATENT DOCUMENTS

| | | | |
|---|---|---|---|
| 2009/0040472 A1* | 2/2009 | Wakita ..................... | G02B 7/28 353/69 |
| 2013/0050291 A1* | 2/2013 | Nobori ................. | H04N 9/3155 345/690 |
| 2015/0264291 A1* | 9/2015 | Tani ..................... | H04N 5/7475 348/748 |

FOREIGN PATENT DOCUMENTS

| | | |
|---|---|---|
| JP | 2004-341029 A | 12/2004 |
| JP | 2006-317559 A | 11/2006 |

(Continued)

*Primary Examiner* — Sherrie Hsia
(74) *Attorney, Agent, or Firm* — Oliff PLC

(57) ABSTRACT

A projector includes an image projection section adapted to let a light pass through a projection lens to project a projection image on a screen, an end part extraction section adapted to detect end parts of the screen and the projection image, a lens shift adjustment mechanism adapted to move the projection lens, an operation receiving section adapted to receive an operation of moving the projection image, and a control section adapted to move the projection lens so that the projection image moves in a first direction in response to the operation, and the control section changes a moving speed at which the projection image moves in the first direction when an inter-end part distance between the end part of the screen and the end part of the projection image gets within a first range while the control section is moving the projection image in response to the operation.

9 Claims, 13 Drawing Sheets

(51) Int. Cl.
 *G06T 7/70* (2017.01)
 *G03B 21/00* (2006.01)

(56) References Cited

FOREIGN PATENT DOCUMENTS

JP  2010-078974 A   4/2010
JP  2011-227119 A   11/2011

* cited by examiner

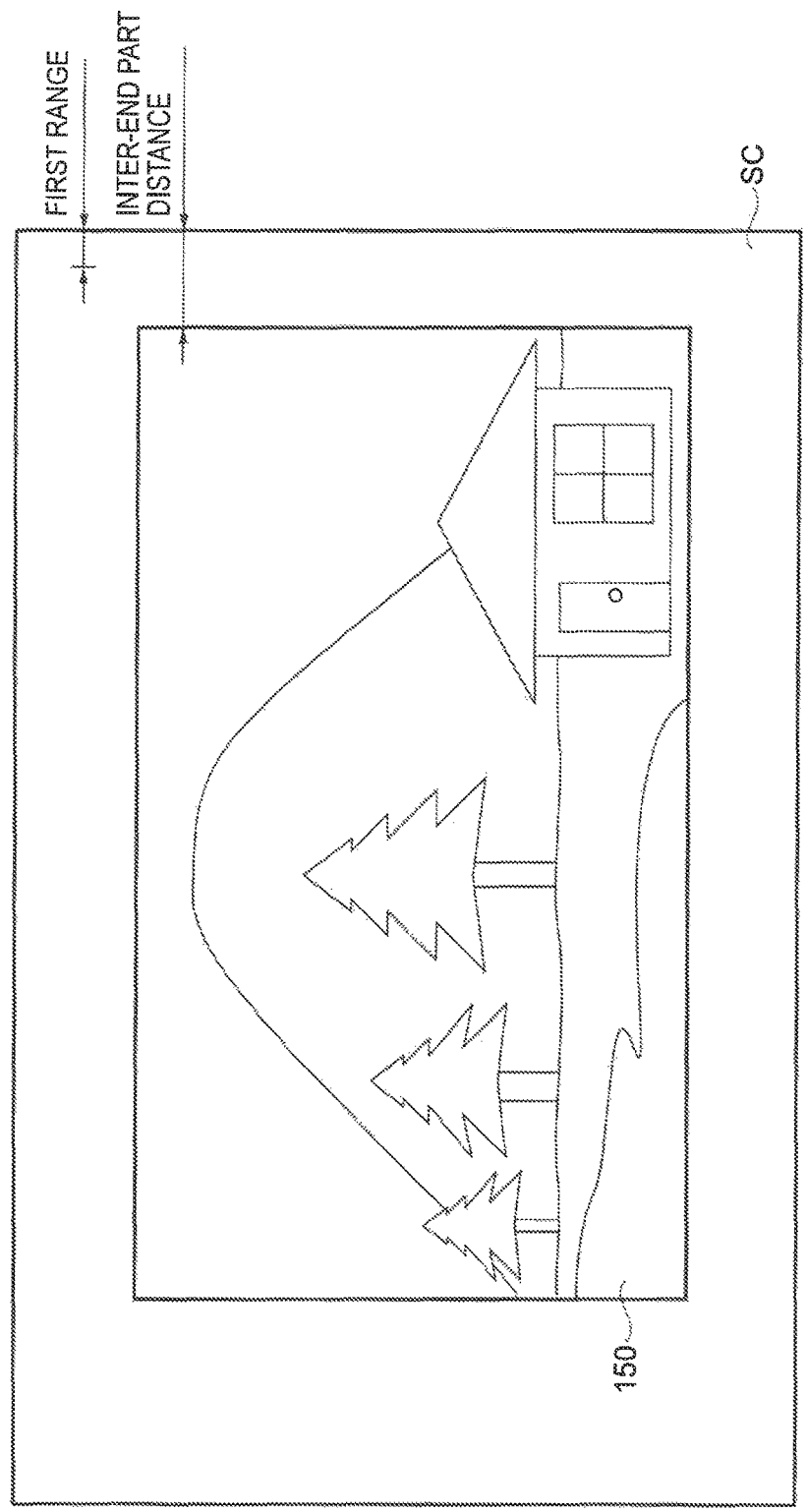

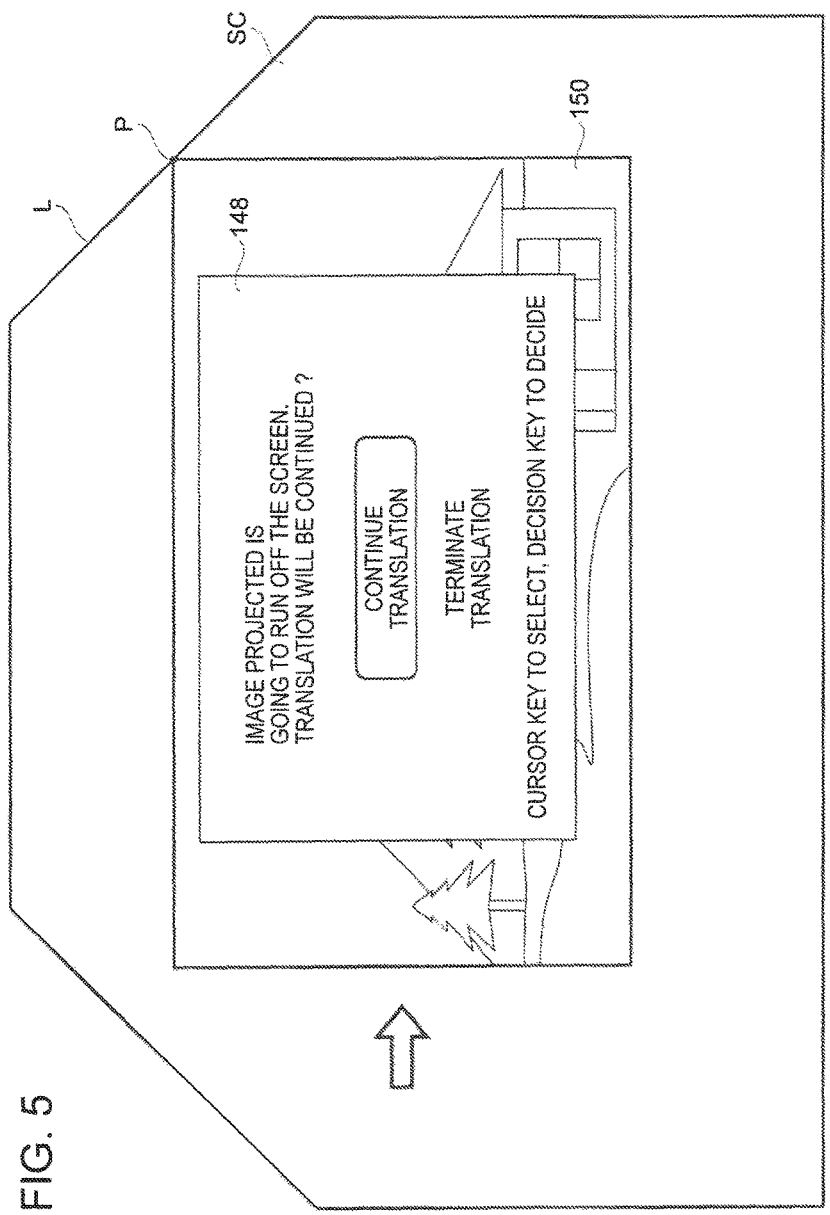

PROJECTOR AND METHOD OF CONTROLLING PROJECTOR

CROSS-REFERENCE

The entire disclosure of Japanese Patent Application No. 2017-145191, filed Jul. 27, 2017, and No. 2018-086428, filed Apr. 27, 2018 are expressly incorporated by reference herein.

BACKGROUND

1. Technical Field

The present invention relates to a projector for projecting an image and a method of controlling the projector.

2. Related Art

There has been known a lens shift function capable of adjusting a projection position on a screen without moving a main body of a projector in the case of projecting an image on the screen with the projector. For example, the projector shown in JP-A-2011-227119 is capable of shifting an optical axis of a projection lens to thereby change the projection position of the image on the screen by moving the position of the projection lens based on an operation of a user.

However, in the case of attempting to make an end part of the image and an end part of the screen close to each other by moving the projection position of the image to the end part of the screen, since the image projected moves on the screen at a constant speed due to a lens shift operation, even in the case in which the user carefully performs the lens shift operation while watching the screen and the image, the end part of the image runs off the screen in some cases, and thus, the convenience of the operation is detracted. Further, regarding a configuration of adjusting the projection position on the screen by changing the forming position of an image in a light modulation device such as a liquid crystal panel in a projector for forming the image with the light modulation device, substantially the same problem arises.

SUMMARY

An advantage of some aspects of the invention is to provide a projector superior in the convenience of the lens shift operation.

The invention can be implemented as the following forms or application examples.

Application Example 1

A projector according to this application example includes a light source adapted to emit first light, a modulation section adapted to generate second light obtained by modulating the first light in accordance with an image signal, a display section having a projection lens, and adapted to let the second light pass through the projection lens to display a projection image on a projection surface, a detection section adapted to detect an end part of the projection surface and an end part of the projection image, a position adjustment section adapted to move the projection lens, an operation receiving section adapted to receive an operation of moving the projection image in a first direction, and a control section adapted to make the position adjustment section move the projection lens so that the projection image moves in the first direction in a case in which the operation receiving section has received the operation, and the control section changes a moving speed at which the projection image moves in the first direction when an inter-end part distance between the end part of the projection surface and the end part of the projection image gets within a first range while the control section is moving the projection image in the first direction due to the operation.

According to the configuration described above, the projector changes the moving speed of the projection image when the inter-end part distance between the end part of the projection surface and the end part of the projection image detected by the detection section gets within the first range while the projector is moving the projection image projected on the projection surface in the first direction based on the operation received by the operation receiving section. Therefore, in the case in which it is attempted to make the end part of the projection image approach the end part of the projection surface, since the translation operation of the projection image can carefully be performed by changing the moving speed of the projection image, the convenience of the operation is improved.

Application Example 2

In the projector according to the application example described above, it is preferable that the control section stops the motion of the projection image in a case in which the end part of the projection image and the end part of the projection surface overlap each other while the control section is moving the projection image in the first direction.

According to the configuration described above, in the case in which the end part of the projection image in motion and the end part of the projection surface overlap each other, the motion of the projection image stops. Therefore, it is possible to prevent the projection image from running off the projection surface to be displayed in a lacking state.

Application Example 3

In the projector according to the application example described above, it is preferable that the control section reduces the moving speed in the case in which the inter-end part distance has gotten within the first range due to the motion of the projection image.

According to the configuration described above, in the case in which it is attempted to make the end part of the projection image approach the end part of the projection surface, since the moving speed of the projection image is reduced when the inter-end part distance gets within the first range, it is possible to correctly perform the translation operation of the projection image.

Application Example 4

In the projector according to the application example described above, it is preferable that the control section makes the display section display a message screen in one of a case in which the motion of the projection image has been stopped and a case in which the moving speed has been reduced.

According to the configuration described above, in the case in which the motion of the projection image has been stopped, or in the case in which the moving speed has been reduced, it is possible to give notice to the user by displaying the message screen.

Application Example 5

In the projector according to the application example described above, it is preferable that the message screen is provided with a receiver adapted to receive a decision on whether to continue the motion of the projection image even if the projection image runs off the projection surface, and the control section continues the motion of the projection image toward the first direction based on the operation in a case in which the receiver has received a decision to continue the motion of the projection image.

According to the configuration described above, in the case in which the message screen has received the decision to continue the motion, the motion of the projection image toward the first direction is continued, and therefore, it is possible to make the projection image run off the projection surface if necessary.

Application Example 6

In the projector according to the application example described above, it is preferable that the control section makes the position adjustment section move the projection image so that the end part of the projection image and the end part of the projection surface overlap each other in a case in which the operation receiving section has received a predetermined operation.

According to the configuration described above, it is possible to move the projection image to easily overlap the end part of the projection image and the end part of the projection surface with each other based on the predetermined operation on the operation receiving section.

Application Example 7

In the projector according to the application example described above, it is possible that the detection section is provided with an imaging section adapted to obtain an image including the projection surface and the projection image by shooting and then output the image, and detects the end part of the projection surface and the end part of the projection image by analyzing the image output by the imaging section.

Application Example 8

A method of controlling a projector according to this application example includes providing a projector including alight source adapted to emit first light, a modulation section adapted to generate second light obtained by modulating the first light in accordance with an image signal, a display section having a projection lens, and adapted to let the second light pass through the projection lens to display a projection image on a projection surface, a detection section adapted to detect an end part of the projection surface and an end part of the projection image, a position adjustment section adapted to move the projection lens, and an operation receiving section adapted to receive an operation of moving the projection image in a first direction, and moving the projection image in the first direction by moving the projection lens based on the operation received by the operation receiving section, and reducing a moving speed at which the projection image moves in the first direction in a case an inter-end part distance between the end part of the projection surface and the end part of the projection image gets within a first range.

According to the method described above, the projector changes the moving speed of the projection image when the inter-end part distance between the end part of the projection surface and the end part of the projection image detected by the detection section gets within the first range while the projector is moving the projection image projected on the projection surface in the first direction based on the operation received by the operation receiving section. Therefore, in the case in which it is attempted to make the end part of the projection image approach the end part of the projection surface, since the translation operation of the projection image can carefully be performed by changing the moving speed of the projection image, the convenience of the operation is improved.

Application Example 9

A projector according to this application example includes a light source adapted to emit first light, a modulation section adapted to generate second light obtained by modulating the first light in accordance with an image signal, a display section having a projection lens, and adapted to let the second light pass through the projection lens to display a projection image on a projection surface, a detection section adapted to detect an end part of the projection surface and an end part of the projection image, a projection image position adjustment section adapted to adjust a position of the projection image on the projection surface, an operation receiving section adapted to receive an operation of moving the projection image in a first direction, and a control section adapted to make the projection image position adjustment section move the projection image in the first direction in a case in which the operation receiving section has received the operation, and the control section reduces a moving speed at which the projection image moves in the first direction when an inter-end part distance between the end part of the projection surface and the end part of the projection image gets within a first range while the control section is moving the projection image in the first direction due to the operation.

According to the configuration described above, the projector reduces the moving speed of the projection image when the inter-end part distance between the end part of the projection surface and the end part of the projection image detected by the detection section gets within the first range while the projector is moving the projection image projected on the projection surface in the first direction based on the operation received by the operation receiving section. Therefore, in the case in which it is attempted to make the end part of the projection image approach the end part of the projection surface, since the translation operation of the projection image can carefully be performed by reducing the moving speed of the projection image, the convenience of the operation is improved.

Application Example 10

In the projector according to the application example described above, the projection image position adjustment section may change a position at which the projection image is formed in the modulation section.

According to the configuration described above, since the projector changes the position at which the projection image is formed in the modulation section to thereby adjust the position of the projection image on the projection surface, it becomes possible to realize the adjustment of the position of the projection image with a simple configuration.

Application Example 11

A method of controlling a projector according to this application example includes providing a projector including a light source adapted to emit first light, a modulation section adapted to generate second light obtained by modulating the first light in accordance with an image signal, a display section having a projection lens, and adapted to let the second light pass through the projection lens to display a projection image on a projection surface, a detection section adapted to detect an end part of the projection surface and an end part of the projection image, a projection image position adjustment section adapted to adjust a position of the projection image on the projection surface, and an operation receiving section adapted to receive an operation of moving the projection image in a first direction, and reducing a moving speed at which the projection image moves in the first direction in a case in which the projection image is moved in the first direction due to the projection image position adjustment section based on the operation received by the operation receiving section, and then an inter-end part distance between the end part of the projection surface and the end part of the projection image gets within a first range.

According to the method described above, the projector reduces the moving speed of the projection image when the inter-end part distance between the end part of the projection surface and the end part of the projection image detected by the detection section gets within the first range while the projector is moving the projection image projected on the projection surface in the first direction based on the operation received by the operation receiving section. Therefore, in the case in which it is attempted to make the end part of the projection image approach the end part of the projection surface, since the translation operation of the projection image can carefully be performed by reducing the moving speed of the projection image, the convenience of the operation is improved.

BRIEF DESCRIPTION OF THE DRAWINGS

The invention will be described with reference to the accompanying drawings, wherein like numbers reference like elements.

FIG. 4B is a diagram showing the projection image moving due to the lens shift process.

FIG. 5 is a diagram showing an example of performing projection using a wall surface of a building as a screen.

DESCRIPTION OF EXEMPLARY EMBODIMENTS

Some embodiments of the invention will hereinafter be described with reference to the accompanying drawings.

First Embodiment

General Description of Projector

Figure 1:
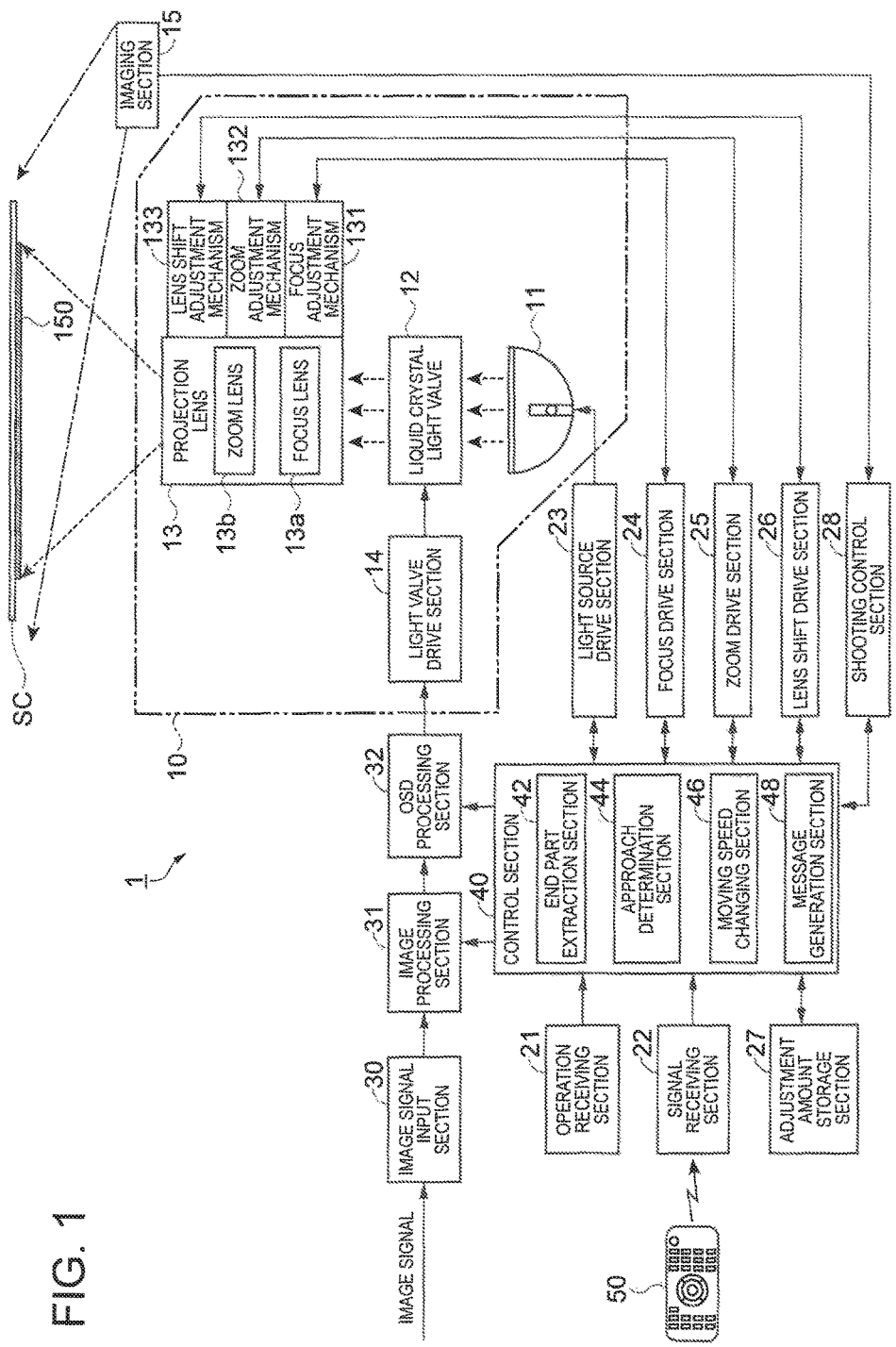
FIG. 1 is a block diagram showing a schematic configuration of a projector according to an embodiment of the invention.

FIG. 1 is a block diagram showing a schematic configuration of a projector according to the present embodiment. The internal configuration of the projector 1 will be explained using FIG. 1.

The projector 1 is provided with an image projection section 10, a control section 40, an operation receiving section 21, a signal receiving section 22, a light source drive section 23, a focus drive section 24, a zoom drive section 25, a lens shift drive section 26, an adjustment amount storage section 27, an image signal input section 30, an image processing section 31, an OSD (on-screen display) processing section 32, a remote controller 50, and so on.

The image projection section 10 is provided with a light source 11 having a discharge light source such as a super-high pressure mercury lamp or a metal halide lamp, or a solid-state light source such as a light emitting diode (LED) or a laser, a liquid crystal light valve 12, a projection lens 13, a light valve drive section 14 for driving the liquid crystal light valve 12, a focus adjustment mechanism 131, a zoom adjustment mechanism 132, and a lens shift adjustment mechanism 133. In the present embodiment, the image projection section 10 includes a section corresponding to a display section for magnifying the light modulated by the liquid crystal light valve 12 with the projection lens 13 to display a projection image 150 on a screen as a projection surface.

The liquid crystal light valve 12 functions as a modulation section, and is constituted by a transmissive liquid crystal panel having a liquid crystal material encapsulated between a pair of transparent substrates, or the like. In the liquid crystal light valve 12, when a drive voltage corresponding to an image signal is applied to each pixel of the liquid crystal light valve 12 due to the drive by the light valve drive section 14, the pixel transmits the light at the light transmission rate corresponding to the image signal to thereby modulate the light.

The light (first light) emitted from the light source 11 is modulated while being transmitted through the liquid crystal light valve 12, and the projection lens 13 projects the light (second light) thus modulated to thereby display the projection image 150 corresponding to the image signal on the screen SC having a rectangular shape.

It should be noted that the modulation section is not limited to the system using the liquid crystal light valve 12, but it is also possible to assume other systems such as a DLP (Digital Light Processing) system or an LCOS (Liquid Crystal On Screen) system.

The projection lens 13 has a focus lens 13*a*, and moves the position of the focus lens 13*a* to thereby make the focus adjustment possible. Further, the projection lens 13 has a zoom lens 13*b*, and changes the zoom state to thereby make an adjustment of the projection field angle possible.

The focus adjustment mechanism 131 is constituted by a motor, gears, and so on, and drives (moves) the focus lens 13*a* to perform the focus adjustment based on a drive signal from the focus drive section 24.

The zoom adjustment mechanism 132 is constituted by a motor, gears, and so on, and drives (moves) the zoom lens 13*b* to perform the zoom adjustment based on the control by the zoom drive section 25.

It should be noted that it is assumed the configuration in which the focus adjustment and the zoom adjustment are performed by driving the motors in the present embodiment, but it is also possible to assume a configuration in which the projection lens 13 is provided with levers for moving the focus lens 13*a* and the zoom lens 13*b*, and the user rotates the levers to perform the focus adjustment and the zoom adjustment.

The lens shift adjustment mechanism 133 is constituted by motors, gears, and so on for respectively moving the projection lens 13 in two directions perpendicular to the optical axis of the projection lens 13, and moves the projection lens 13 at a predetermined speed based on drive signals from the lens shift drive section 26 to thereby move the projection position of the projection image 150 on the screen SC in a desired direction (a first direction) out of the right, left, up, and down directions at a moving speed corresponding to the predetermined speed.

It should be noted that an initial value of the predetermined speed representing the number of rotations per unit time of the motor is stored in the adjustment amount storage section 27, for example, and when the projector 1 is started up, the value is retrieved from the adjustment amount storage section 27 and is set.

Further, the lens shift adjustment mechanism 133 detects the lens shift state of the projection lens 13 as a lens shift amount. Then, the lens shift adjustment mechanism 133 outputs the lens shift amount thus detected to the lens shift drive section 26. In the present embodiment, the lens shift adjustment mechanism 133 and the lens shift drive section 26 correspond to a position adjustment section for moving the projection lens 13.

In the present embodiment, as a method of detecting the lens shift amount, the displacement of the projection lens 13 is detected by an encoder or the like. It should be noted that as another method of detecting the lens shift amount, it is possible to use the motor of the lens shift adjustment mechanism 133 as a stepping motor, and detect the lens shift amount based on the number of steps of the stepping motor.

An imaging section 15 has an imaging optical system, an imaging element such as a CCD or a CMOS, an interface circuit, and so on, and shoots the projection direction of the projection lens 13 to output shot image data of a shot image. The imaging optical system of the imaging section 15 is disposed facing the same direction as that of the projection lens 13, and has a field angle for shooting a wider range than the screen SC.

The control section 40 is provided with a processor such as a central processing unit (CPU), a RAM used as a temporary storage for a variety of data, a nonvolatile memory such as a mask ROM, a flash memory, or a ferroelectric RAM (FeRAM), and so on (neither of them is shown in the drawings), and functions as a computer. By the processor operating in accordance with a control program stored in the nonvolatile memory, namely by the hardware and the software cooperating with each other, the control section 40 realizes the functional section provided to the control section 40, and thus, performs the overall control of the operation of the projector 1. It should be noted that the control section 40 can also be provided with a plurality of processors.

For example, the control section 40 has a function of making the lens shift adjustment mechanism 133 move the projection lens 13 so that the projection image 150 moves in the first direction in the case of receiving an operation of moving the projection lens 13. It should be noted that the details of the functional section provided to the control section 40 will be described later.

The operation receiving section 21 is provided with a plurality of keys and so on for providing a variety of instructions to the projector 1. As the keys provided to the operation receiving section 21, there can be cited a "power key" for switching ON/OFF the power, an "input switching key" for switching image signals input, a "menu key" for switching display/nondisplay of the menu screen for performing a variety of settings, an "adjustment start key" for starting the lens shift adjustment, a zoom adjustment and the focus adjustment, "cursor keys" used for moving the cursor in the menu screen, and designating the adjustment direction and the adjustment amount in the lens shift adjustment, the zoom adjustment and the focus adjustment, a "decision key" for deciding the variety of settings, and so on. When the user operates the operation receiving section 21, the operation receiving section 21 outputs control information corresponding to the content of the operation by the user to the control section 40.

In the present embodiment, the "cursor keys" receive the operation for moving the projection position of the projection image 150 on the screen SC in the right, left, up, and down directions.

The remote controller 50 emits an operation signal such as infrared ray corresponding to the operation content by the user to perform a variety of instruction to the main body of the projector 1. The remote controller 50 has a configuration covered with a housing, and on the surface of the housing, there is provided a plurality of keys.

As the keys provided to the remote controller 50, there can be cited a "power key" for switching ON/OFF the power of the projector 1, an "input switching key" for switching image signals input, a "menu key" for switching display/nondisplay of the menu screen for performing a variety of settings, an "adjustment start key" for starting the lens shift adjustment, a zoom adjustment and the focus adjustment, "cursor keys" used for moving the cursor in the menu screen, and designating the adjustment direction and the adjustment amount in the lens shift adjustment, the zoom adjustment and the focus adjustment, a "decision key" for deciding the variety of settings, and so on. The operation signal emitted by the remote controller 50 is received by the signal receiving section 22.

The signal receiving section 22 is configured including an infrared receiving module and so on, receives the operation signal emitted from the remote controller 50, and then outputs the operation signal to the control section 40 as the control information.

The light source drive section 23 performs supply or stop of the power to the light source 11 based on the instruction from the control section 40, to thereby switch between lighting and extinction of the light source 11.

The focus drive section 24 generates the drive signal of the focus adjustment mechanism 131 based on the instruction from the control section 40, and then transmits the drive signal thus generated to the focus adjustment mechanism 131 to move the focus lens 13a.

The zoom drive section 25 generates the drive signal of the zoom adjustment mechanism 132 based on the instruction from the control section 40, and then transmits the drive signal thus generated to the zoom adjustment mechanism 132 to move the zoom lens 13b.

The lens shift drive section 26 generates the drive signal of the lens shift adjustment mechanism 133 based on the instruction from the control section 40, and then transmits the drive signal thus generated to the lens shift adjustment mechanism 133 to move the projection lens 13. In the present embodiment, in the case in which the user selects the lens shift in the menu screen displayed by holding down the "menu key," and then holds down the "cursor key," the lens shift drive section 26 moves the projection lens 13 as much as a predetermined distance in the direction of the "cursor key" held down. Thus, the projection image 150 projected on the screen SC moves as much as a predetermined amount. Further, the lens shift drive section 26 changes the speed at which the projection lens 13 moves based on the speed change instruction from the control section 40. It should be noted that it is also possible for the lens shift drive section 26 to obtain the lens shift amount of the motion from the lens shift adjustment mechanism 133, and then feed back the lens shift amount to the control section 40.

The adjustment amount storage section 27 consists of a nonvolatile memory, and stores a movable amount of the projection lens 13 by the lens shift adjustment mechanism 133, and information related to a reference position used as a reference of the display of the information related to the displacement of the projection lens 13. Further, the adjustment amount storage section 27 stores information related to a reference speed in the case in which the projection lens 13 moves due to the lens shift adjustment mechanism 133. The information related to the reference position and the information related to the reference speed stored in the adjustment amount storage section 27 are retrieved by the control section 40.

A shooting control section 28 makes the imaging section 15 perform shooting to output shot image data based on the instruction from the control section 40. In the present embodiment, when the shooting control section 28 instructs the imaging section 15 to perform shooting, the imaging section 15 shoots an area including the screen SC and the projection image 150 projected on the screen SC, and then outputs the shot image data obtained by the shooting to the control section 40. It should be noted that the control section 40 instructs shooting at predetermined time intervals to the shooting control section 28 during the period in which the projection image 150 is moving due to the execution of the lens shift process.

The image signal input section 30 is provided with a variety of image input terminals for achieving the connection with external image supply devices (not shown) such as a personal computer, a video reproduction device, a memory card, a USB storage, or a digital camera via a cable, and the image signal is input from the image supply device. The image signal input section 30 converts the image signal thus input into image data with a format which can be processed by the image processing section 31, and then output the image data to the image processing section 31.

Based on the instructions from the control section 40, the image processing section 31 performs a variety of image quality control processes such as an adjustment of brightness, contrast, sharpness, or color, or gamma correction on the image data input from the image signal input section 30. The image processing section 31 outputs the image data on which such adjustment and processes as described above are performed to the OSD processing section 32.

Based on the instruction of the control section 40, the OSD processing section 32 performs a process of superimposing an OSD image such as a menu screen or a message screen on the image data input from the image processing section 31. The OSD processing section 32 is provided with an OSD memory not shown, and stores OSD image data representing figures, fonts, and so on for forming the OSD image.

When the control section 40 instructs the superposition of the OSD image, the OSD processing section 32 reads out the necessary OSD image data from the OSD memory, and then combines the OSD image data with the image data input from the image processing section 31 so that the OSD image is superimposed at a predetermined position on the input image. The image data with which the OSD image data is combined is output to the light valve drive section 14.

It should be noted that in absence of the instruction from the control section 40 to superimpose the OSD image, the OSD processing section 32 outputs the image data which is output from the image processing section 31, directly to the light valve drive section 14.

When the light valve drive section 14 drives the liquid crystal light valve 12 in accordance with the image data input from the OSD processing section 32, the liquid crystal light valve 12 modulates the light entering the liquid crystal light valve 12 from the light source 11 into image light in accordance with the image data, and the image light is projected from the projection lens 13.

Details of Functional Sections in Control Section

Then, the details of functional sections provided to the control section 40 will be described. In the present embodiment, the control section 40 is provided with an end part extraction section 42, an approach determination section 44, a moving speed changing section 46 and a message generation section 48. The control section 40 has a function of changing the moving speed at which the projection image 150 moves in the first direction when an inter-end part distance between an end part of the screen SC and an end part of the projection image 150 gets within a first range during the period in which the control section 40 is moving the projection image 150 in the first direction based on the operation of the user such as holding down of the "cursor key."

The end part extraction section 42 analyzes the two-dimensional shot image data obtained by the imaging section 15 by shooting to extract end parts of the screen SC and end parts of the projection image 150 projected on the screen SC.

As the method of extracting the end parts from the two-dimensional image, there can be adopted a well-known edge detection method (e.g., a search-based method, or a zero crossover point method). The end part extraction section 42 extracts the end parts in the four directions (right, left, up, and down directions) of the screen SC having a rectangular shape and the end parts in the four directions (right, left, up, and down directions) of the projection image 150, and then outputs position information of each of the end parts thus extracted to the approach determination section 44. It should be noted that in the present embodiment, the imaging section 15, the shooting control section 28 and the end part extraction section 42 correspond to a detection section for analyzing the image obtained by the imaging section 15 by shooting to thereby detect the end parts of the screen SC and the end parts of the projection image 150.

The approach determination section 44 calculates the inter-end part distance defined by the end part of the screen SC and the end part of the projection image 150 with respect to each of the directions based on the positions of the end parts output by the end part extraction section 42. Further, the approach determination section 44 determines whether or not the inter-end part distance thus calculated is included in the first range, and then determines whether or not the end part of the projection image 150 approaches the end part of the screen SC based on the result of the determination. The inter-end part distance and the first range can be expressed by pixel constituting the shot image obtained by the imaging section 15 by shooting, or can also be represented by the actual distance (in terms of, e.g., meter) converted based on the characteristics of the imaging optical system and the imaging element of the imaging section 15. For example, the first range can be set as 0 pixel (i.e., the state in which the end part of the projection image 150 and the end part of the screen SC overlap each other) through 100 pixels.

The approach determination section 44 outputs approach information representing the approach between the end part of the projection image 150 and the end part of the screen SC to the moving speed changing section 46 in the case in which the projection image 150 has moved due to the lens shift, and the approach determination section 44 has determined that the end part of the projection image 150 has approached the end part of the screen SC.

The moving speed changing section 46 changes the moving speed at which the projection image 150 moves due to the lens shift in the case in which the moving speed changing section 46 has received the approach information output by the approach determination section 44. In the present embodiment, the moving speed changing section 46 instructs a speed change to the lens shift drive section 26 so as to reduce the speed at which the projection lens 13 moves to a level lower than the current speed in the case of changing the moving speed of the projection image 150. In this case, it is possible for the moving speed changing section 46 to select and then instruct one of predetermined speeds, or to set a predetermined proportionality constant with respect to the current moving speed to determine the changed speed.

Further, in the present embodiment, the moving speed changing section 46 reduces the moving speed of the projection image 150 due to the lens shift in the case in which the end part of the screen SC and the end part of the projection image 150 have approached each other within the first range, and further, stops the motion, namely instructs deceleration to make the moving speed "0," in the case in which the end part of the screen SC and the end part of the projection image 150 overlap each other.

Incidentally, the moving speed set in the case in which the end part of the screen SC and the end part of the projection image 150 have approached each other within the first range can be kept constant until the end part of the screen SC and the end part of the projection image 150 overlap each other, or can gradually be reduced as the inter-end part distance shortens.

The moving speed changing section 46 outputs change information representing the change in speed to the message generation section 48 in the case in which the moving speed of the projection image 150 has been changed.

It should be noted that in the case in which a predetermined operation such as continuously holding down the "cursor key" beyond a predetermined period has been performed, it is also possible for the moving speed changing section 46 to move the projection image 150 in the direction of the "cursor key" held down, and then stop the motion of the projection image 150 at the position where the end part of the projection image 150 overlaps the end part of the screen SC. Thus, it is possible to promptly move the projection image 150 to the desired end part of the screen SC.

In the case in which the message generation section 48 has received the change information from the moving speed changing section 46, the message generation section 48 generates a message screen including a message corresponding to the change information, and then transmits the message screen thus generated to the OSD processing section 32 to make the message screen be projected on the screen SC as the OSD image. Further, it is also possible for the message generation section 48 to output response information corresponding to the response from the user to the message screen to the moving speed changing section 46.

Figure 2:
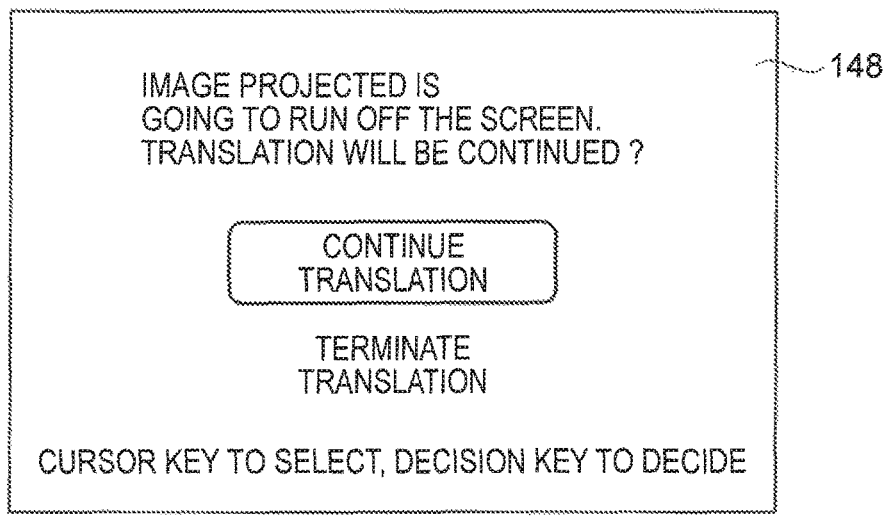
FIG. 2 is a diagram showing an example of a message screen.

FIG. 2 shows a warning screen 148 as an example of the message screen. Such a warning screen 148 is generated in the case in which the change information represents the reduction of the moving speed, or the case in which the motion has stopped due to the overlap between the two end parts.

The warning screen 148 has buttons as a receiver for receiving whether to continue the translation of the projection image 150, and in the case in which the user has selected "CONTINUE TRANSLATION" representing a decision of continuation, the message generation section 48 outputs information representing the fact that the continuation of the translation of the projection image 150 has been selected to the moving speed changing section 46. The moving speed changing section 46 moves the projection image 150 at the speed set before the stoppage in accordance with the holding down of the "cursor key." As a result, a part of the projection image 150 is projected so as to run off the screen SC.

On the other hand, in the case in which the user has selected "TERMINATE TRANSLATION" in response to the warning screen 148, the projection image 150 does not move even if the "cursor key" of the direction in which the projection image 150 runs off the screen SC is held down. It should be noted that the "cursor keys" of other three directions than the "cursor key" described above are valid, and it is possible to move the projection image 150 in the direction pointed in accordance with holding down of the "cursor key."

Figure 3:
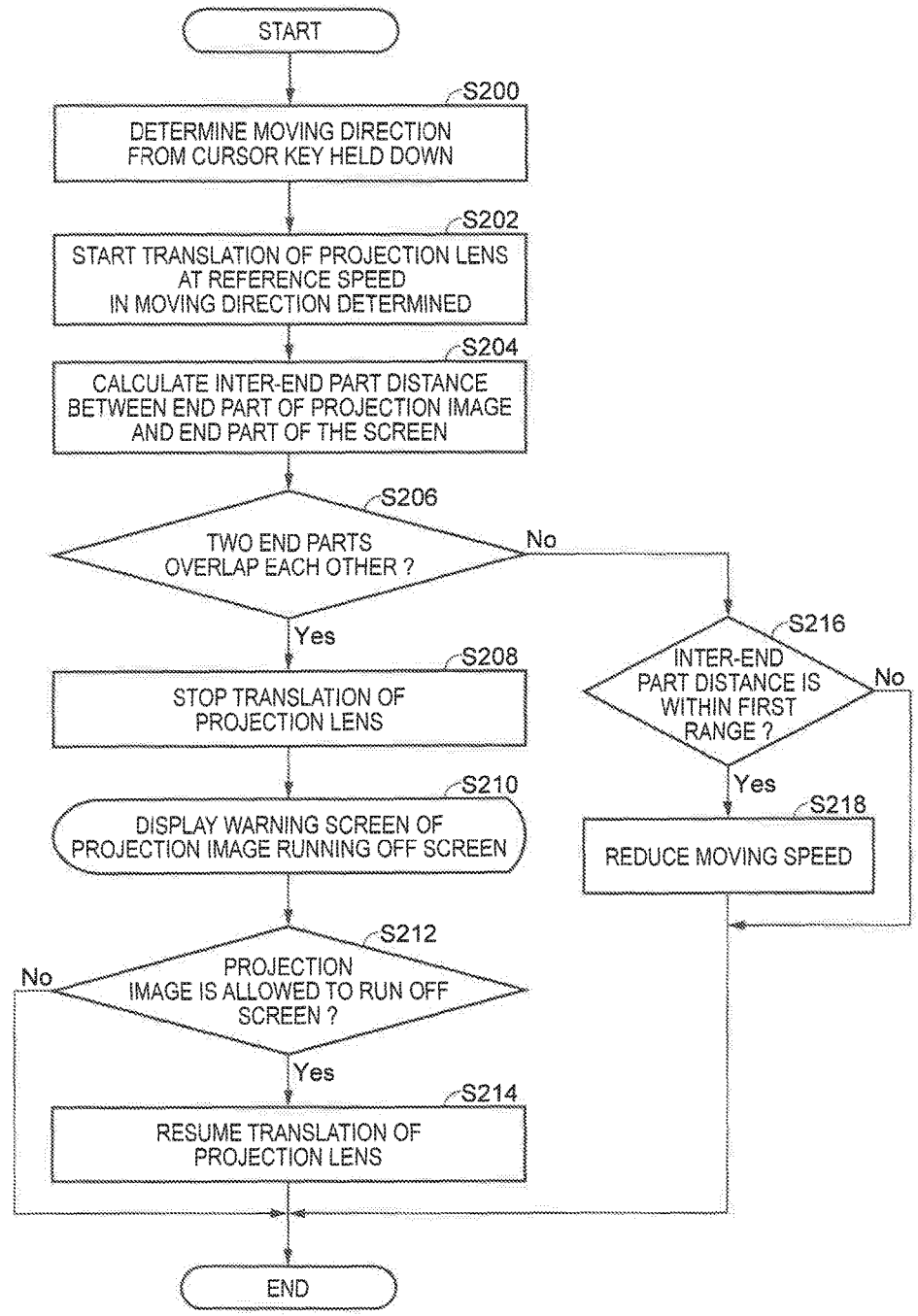
FIG. 3 is a flowchart showing a flow of a lens shift process.

FIG. 3 is a flowchart showing flow (control method) of the lens shift process. In the present embodiment, this process is performed every time the "cursor key" is held down. It should be noted that FIG. 4A through FIG. 4E are diagrams showing the translation of the projection image 150 projected on the screen SC in the case in which the lens shift process is performed, and the explanation will be presented arbitrarily with reference to these drawings.

Figure 4A:
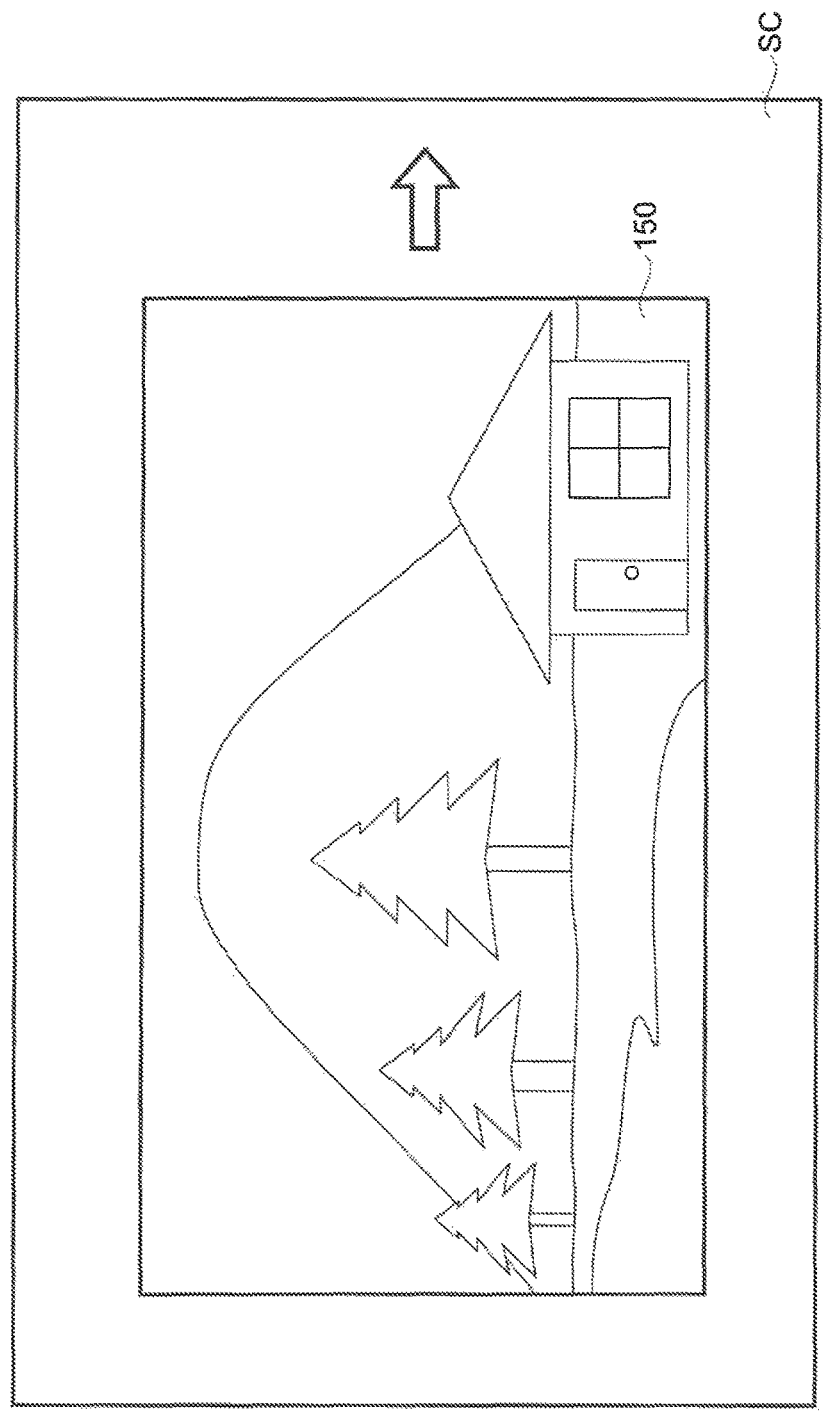
FIG. 4A is a diagram showing a projection image moving due to the lens shift process.

As shown in FIG. 4A, in the case in which the projection image 150 is projected on the screen SC, when the user selects the lens shift from the menu screen displayed in response to the user holding down the "menu key," and then holds down the "cursor key," the lens shift process is started. When the lens shift process is started, the control section 40 firstly determines (step S200) the moving direction of the projection lens 13 from the "cursor key" held down. In this case, the direction (the first direction) in which the projection image 150 moves is set to the right direction.

Subsequently, the control section 40 starts (step S202) moving the projection lens 13 at a reference speed in the moving direction thus determined. Thus, the projection image 150 starts moving on the screen SC.

Then, the control section 40 extracts the end part of the projection image 150 and the end part of the screen SC from the image obtained by the imaging section 15 by shooting, and then calculates (step S204) the inter-end part distance (the distance between the end part of the projection image 150 and the end part of the screen SC) between the two end parts.

Then, the control section 40 determines (step S206) whether or not the two end parts overlap each other from the inter-end part distance thus calculated.

Here, in the case in which it is determined that the two end parts do not overlap each other from the inter-end part distance thus calculated (No in the step S206), the control section 40 determines (step S216) whether or not the inter-end part distance thus calculated is within the first range.

Here, as shown in FIG. 4B, in the case in which it is determined that the inter-end part distance is not within the first range (No in the step S216), the projection lens 13 moves as much as a predetermined distance, and then the process is terminated.

Figure 4C:
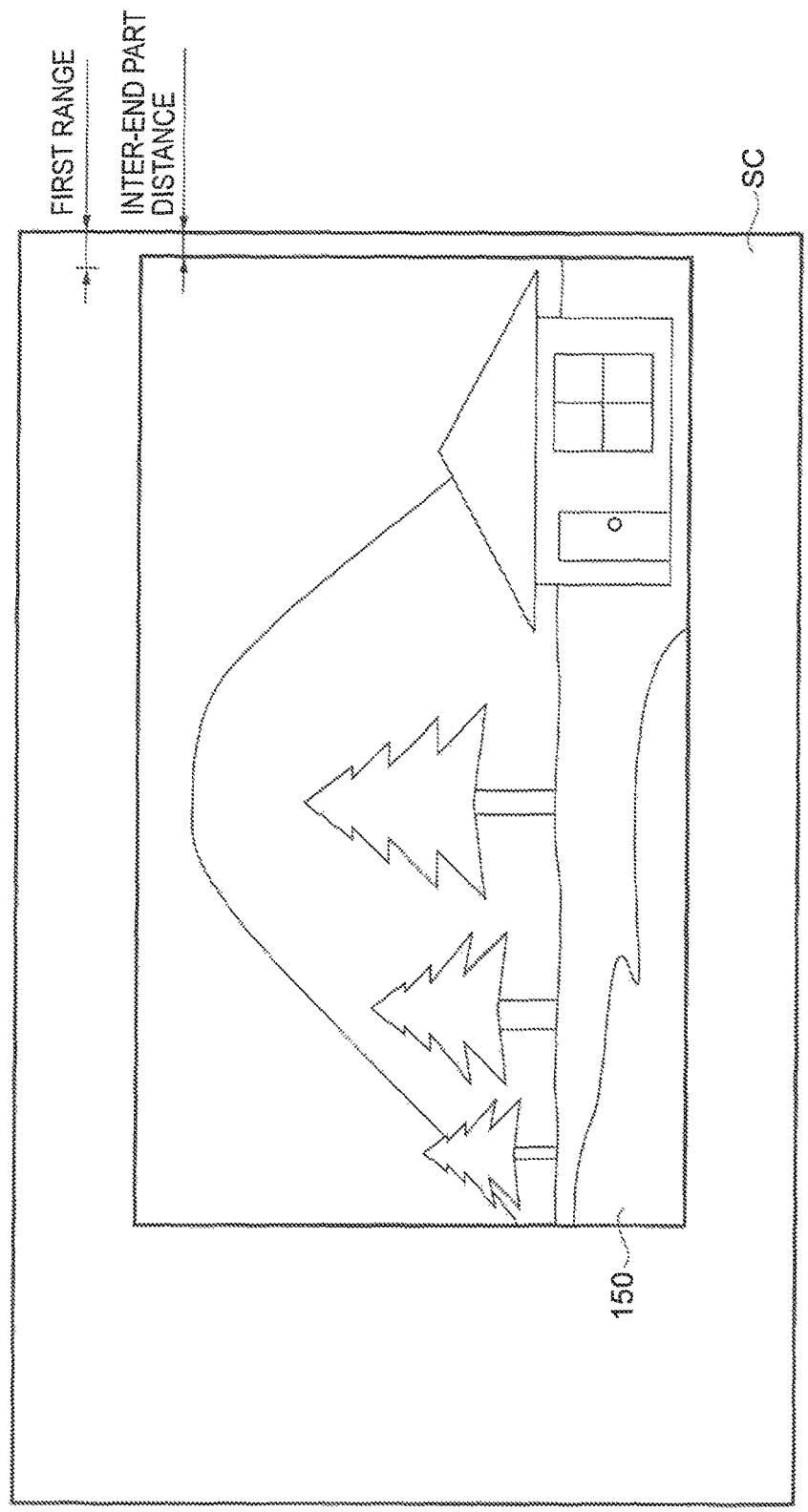
FIG. 4C is a diagram showing the projection image moving due to the lens shift process.

On the other hand, as shown in FIG. 4C, in the case in which it is determined that the inter-end part distance is within the first range (Yes in the step S216), the control section 40 changes the speed at which the projection image 150 is moved in the first direction, and then moves the projection lens 13 as much as the predetermined distance, and then terminates the process.

Specifically, the moving speed changing section 46 instructs the lens shift drive section 26 on the speed change so as to reduce the speed at which the projection lens 13 moves to a level lower than the current speed. In this case, it is possible for the moving speed changing section 46 to select and then instruct one of predetermined speeds, or to set a predetermined proportionality constant with respect to the current moving speed to determine the changed speed. More specifically, it is also possible to perform setting so as to reduce an amount of the translation of the projection image 150 in accordance with a single holding down operation of the "cursor key."

Figure 4D:
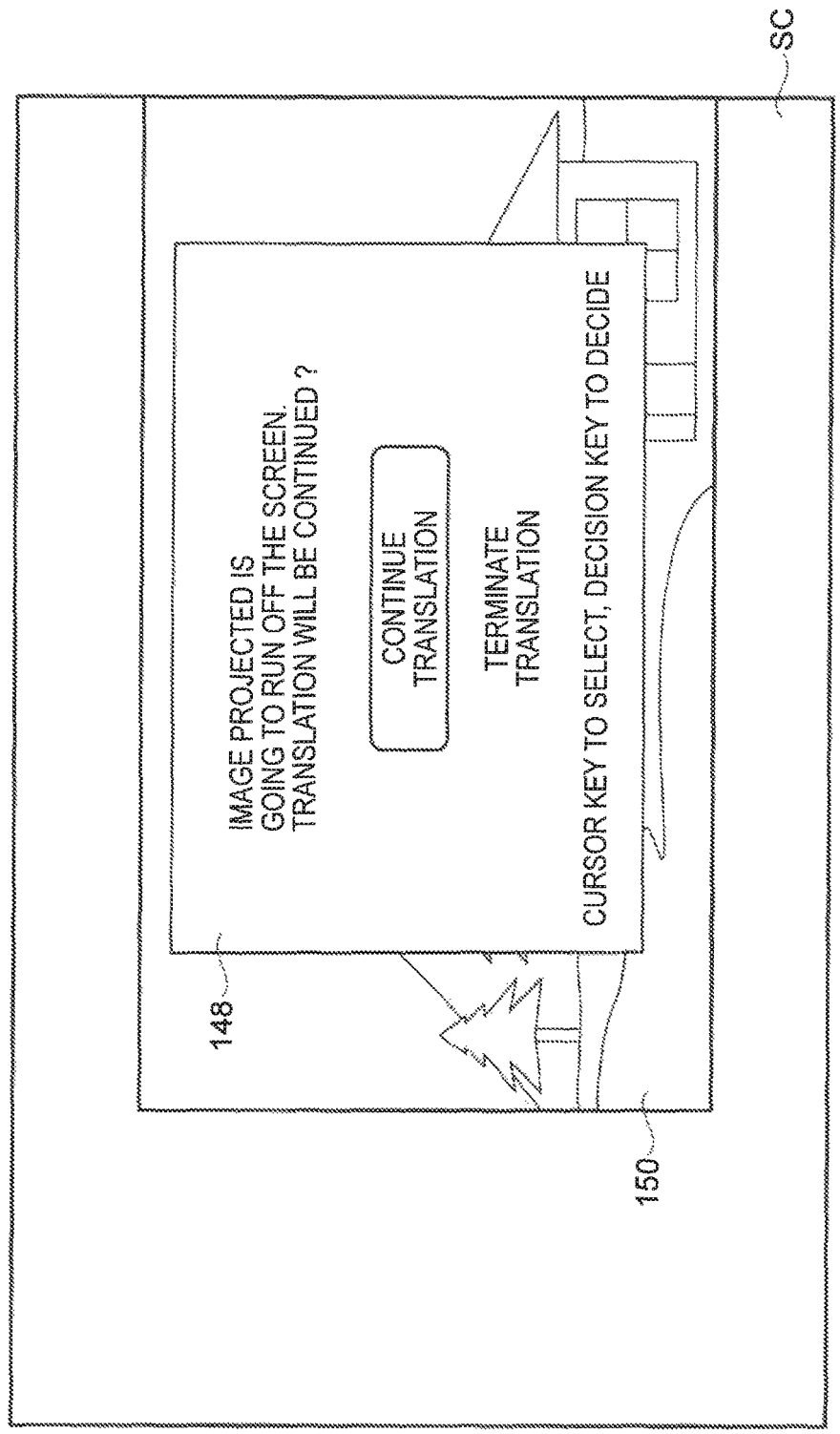
FIG. 4D is a diagram showing the projection image moving due to the lens shift process.

Further, in the step S206, in the case in which it is determined that the two end parts overlap each other as shown in FIG. 4D (Yes in the step S206), the control section 40 stops (step S208) the translation of the projection lens 13. Thus, the projection image 150 moving on the screen SC stops.

Then, the control section 40 projects (step S210) the warning screen 148 of the projection image 150 running off the screen so as to be superimposed on the projection image 150 as the OSD image.

Then, based on the answer of the user to the warning screen 148, the control section 40 determines (step S212) whether or not the projection image 150 is allowed to run off the screen SC.

Here, in the case in which it has been determined that it is not preferable for the projection image 150 to run off the screen SC (No in the step S212), the control section 40 terminates the process. Thus, even if the user holds down the "cursor key" to instruct the translation toward the first direction of the projection image 150, the projection image 150 does not move in the first direction.

Figure 4E:
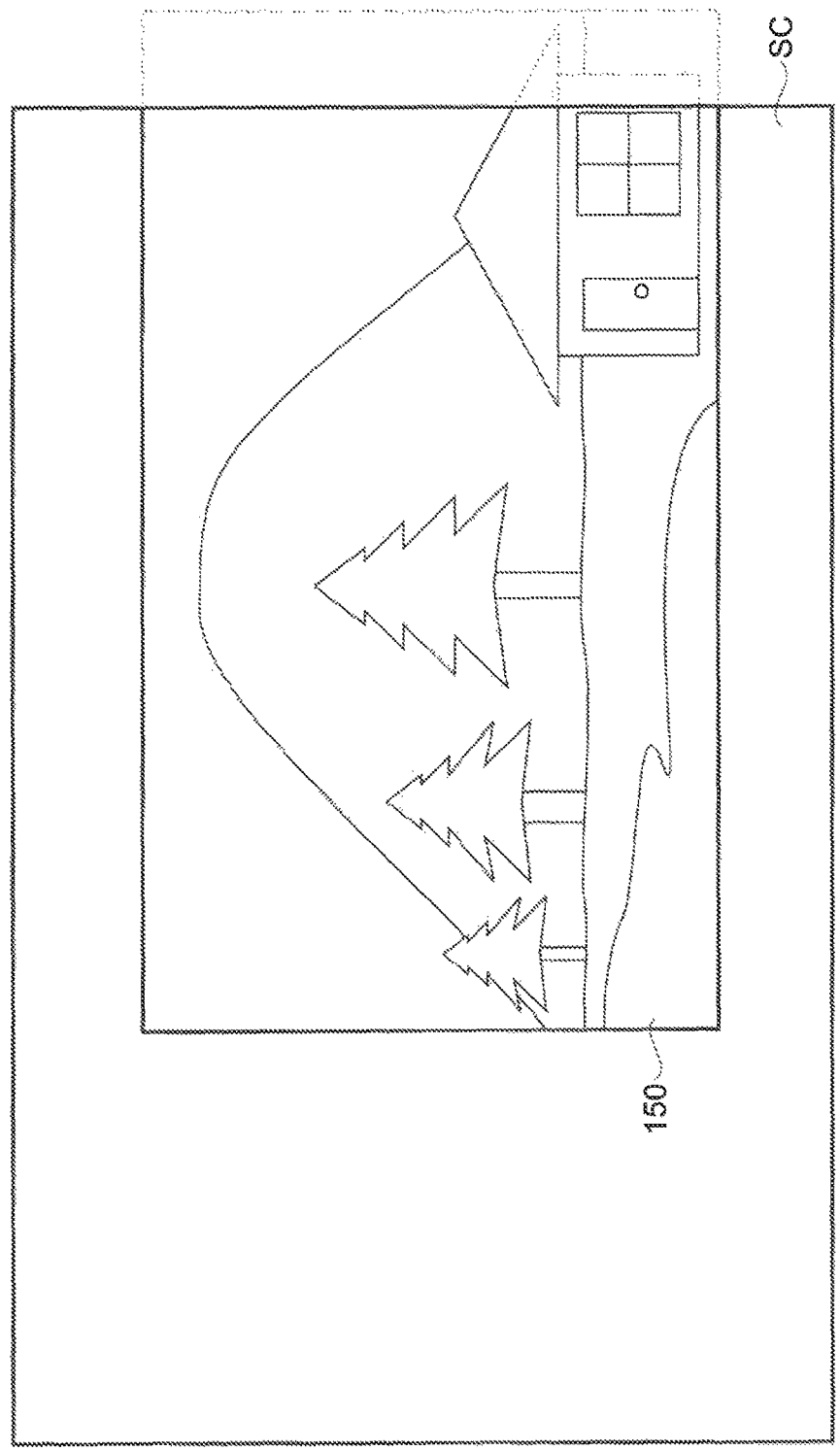
FIG. 4E is a diagram showing the projection image moving due to the lens shift process.

On the other hand, in the case in which it has been determined that it is allowable for the projection image 150 to run off the screen SC (Yes in the step S212), the control section 40 resumes (step S214) the translation of the projection lens 13 toward the first direction, and terminates the process after the projection lens 13 moves as much as the predetermined distance. Thus, as shown in FIG. 4E, there is achieved the state in which a part of the projection image 150 runs off the screen SC.

According to the embodiment described hereinabove, the following advantages can be obtained.

(1) The projector 1 changes the moving speed of the projection image 150 when the inter-end part distance between the end part of the screen SC and the end part of the projection image 150 extracted by the end part extraction section 42 gets within the first range while the projector 1 is moving the projection image 150 projected on the screen SC in the first direction based on the operation received by the operation receiving section 21. Therefore, in the case in which it is attempted to make the end part of the projection image 150 approach the end part of the screen SC, since the translation operation of the projection image 150 can carefully be performed by changing the moving speed of the projection image 150, the convenience of the lens shift operation is improved.

(2) In the case in which the end part of the projection image 150 in motion and the end part of the screen SC overlap each other, the projector 1 stops the translation of the projection image 150. Therefore, it is possible to prevent the projection image 150 from running off the screen SC to be displayed in a lacking state.

(3) In the case in which it is attempted to make the end part of the projection image 150 approach the end part of the screen SC, since the projector 1 reduces the moving speed of the projection image 150 when the inter-end part distance gets within the first range, it is possible for the user to correctly perform the translation operation of the projection image 150.

(4) In the case in which the projector 1 has stopped the translation of the projection image 150, or reduced the moving speed, it is possible for the projector 1 to project the warning screen 148 to thereby give notice to the user.

(5) The projector 1 has the buttons for receiving the decision on whether to continue the translation of the projection image 150 even if the projection image 150 runs off the screen SC, and in the case in which the user makes the decision to continue the translation, the translation of the projection image 150 toward the first direction is continued. Therefore, it is possible to remove at least a part of the projection image 150 from the screen SC.

(6) It is possible for the projector 1 to move the projection image 150 to easily overlap the end part of the projection image 150 and the end part of the screen SC with each other based on the predetermined operation on the operation receiving section 21.

Second Embodiment

A projector according to a second embodiment will hereinafter be described.

The projector 1 according to the present embodiment has substantially the same configuration (see FIG. 1) as that of the first embodiment, but is not provided with the zoom adjustment mechanism 132 and the lens shift adjustment mechanism 133, and the zoom drive section 25 and the lens shift drive section 26 for driving these mechanisms. Instead, the projector 1 according to the present embodiment is configured so as to be able to implement a simplified size adjustment function and a simplified position adjustment function.

The simplified size adjustment function is for adjusting the size (hereinafter also referred to as a "screen size") of the projection image 150 on the screen SC similarly to the zoom adjustment mechanism 132, but on the one hand, the zoom adjustment mechanism 132 optically adjusts the screen size, and on the other hand, the simplified size adjustment function electronically adjusts the screen size. Further, the simplified position adjustment function is for adjusting the projection position of the projection image 150 on the screen SC similarly to the lens shift adjustment mechanism 133, but on the one hand, the lens shift adjustment mechanism 133 optically adjusts the projection position, and on the other hand, the simplified position adjustment function electronically adjusts the projection position.

It should be noted that it is also possible for the projector 1 to be provided with the zoom adjustment mechanism 132, the lens shift adjustment mechanism 133, the zoom drive section 25 and the lens shift drive section 26 and further configured to be capable of implementing the simplified size adjustment function and the simplified position adjustment function.

Figure 6A:
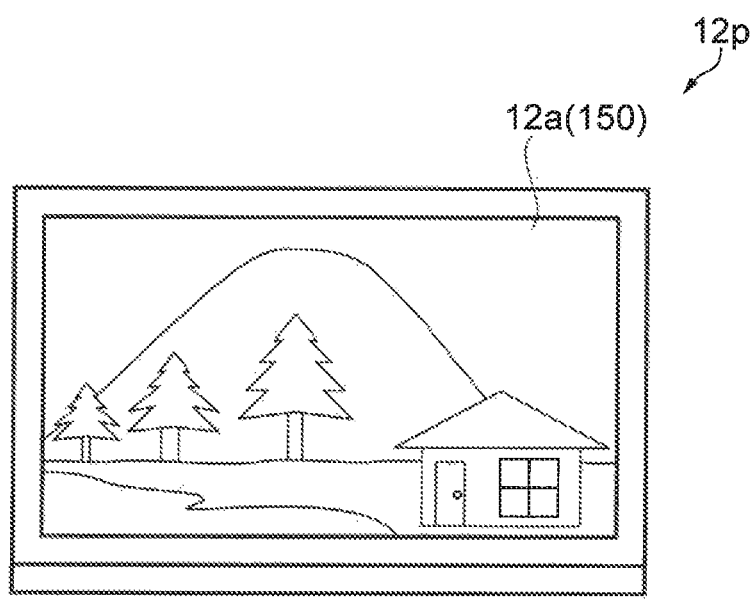
FIG. 6A is an explanatory diagram for explaining a simplified size adjustment function, and a diagram showing a liquid crystal panel.
Figure 6B:
FIG. 6B is an explanatory diagram for explaining the simplified size adjustment function, and a diagram showing a projection image projected on the screen.
Figure 6C:
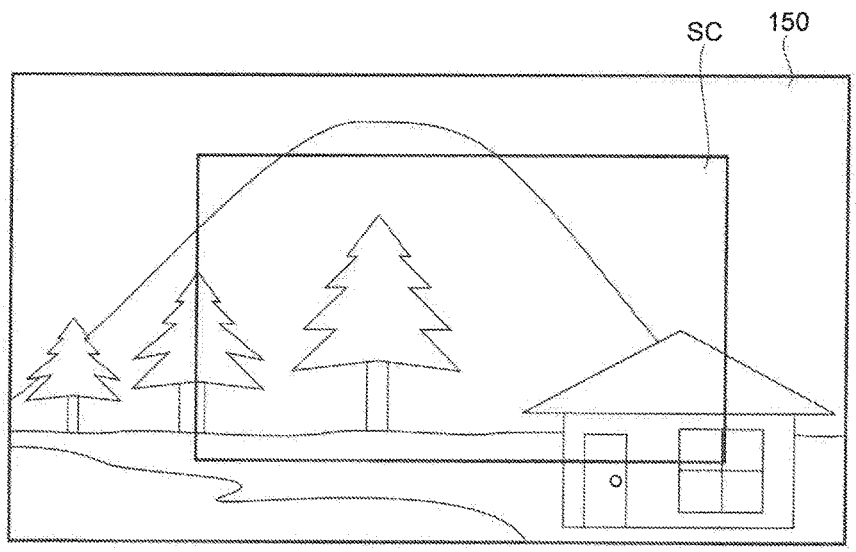
FIG. 6C is an explanatory diagram for explaining the simplified size adjustment function, and a diagram showing a projection image projected on the screen.
Figure 7A:
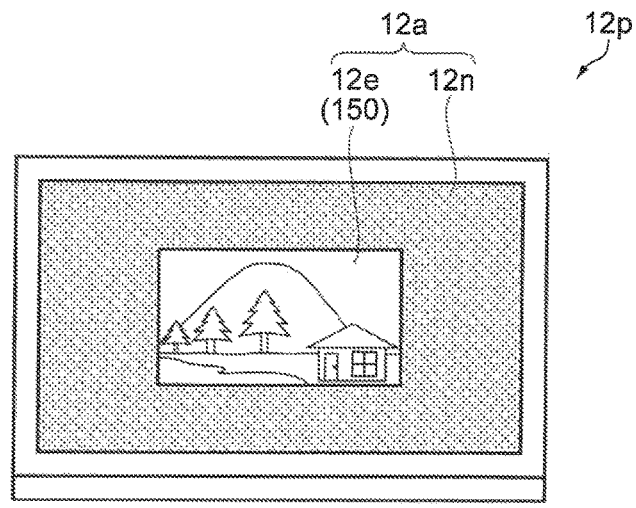
FIG. 7A is an explanatory diagram for explaining the simplified size adjustment function, and a diagram showing the liquid crystal panel.
Figure 7B:
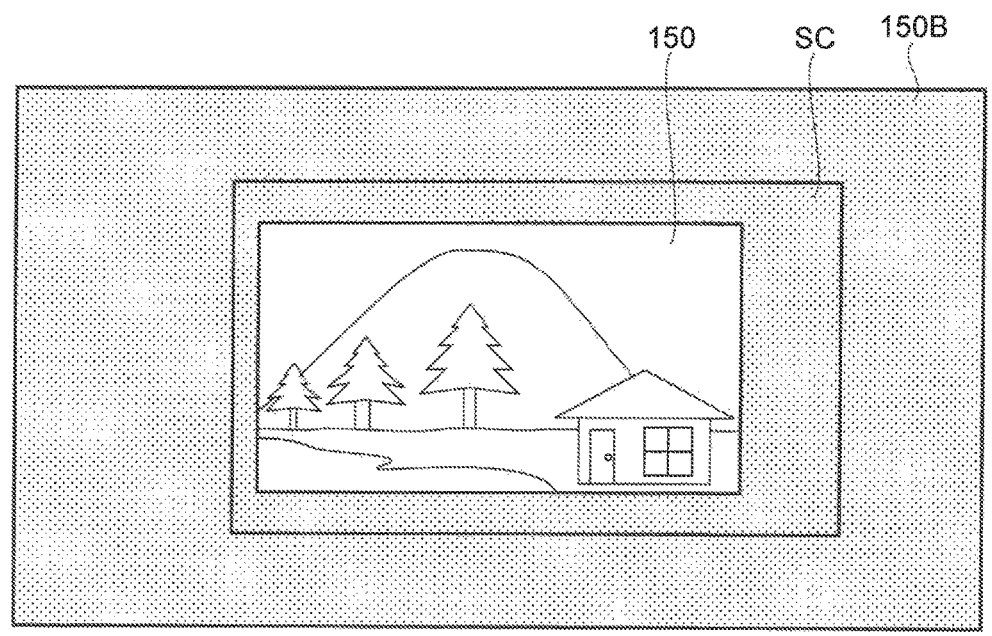
FIG. 7B is an explanatory diagram for explaining the simplified size adjustment function, and a diagram showing a projection image projected on the screen.

FIG. 6A, FIG. 6B, FIG. 6C, FIG. 7A and FIG. 7B are explanatory diagrams for explaining the simplified size adjustment function. Among these drawings, FIG. 6A and FIG. 7A are diagrams showing a liquid crystal panel 12p provided with the liquid crystal light valve 12, wherein FIG. 6B, FIG. 6C, and FIG. 7B are diagrams showing the projection image 150 projected on the screen SC.

As shown in FIG. 6A and FIG. 7A, the liquid crystal panel 12p is provided with a pixel area 12a having a rectangular shape and a plurality of pixels not shown arranged in a matrix. Since each of the pixels in the pixel area 12a is set to a light transmission rate corresponding to the image signal due to the drive by the light valve drive section 14, when the light having been transmitted through the pixel area 12a is projected on the screen SC, the projection image 150 corresponding to the image signal is displayed on the screen SC. It should be noted that hereinafter, setting the light transmission rate of each of the pixels in the pixel area 12a for displaying the projection image 150 is also expressed as "forming the projection image 150 in the pixel area 12a." Further, the orientation of the image on the liquid crystal panel 12p and the orientation of the image on the screen SC do not necessarily coincide with each other, but in the drawings, the images are shown so as to make the orientations coincide with each other in order to simplify the description.

In order to display the projection image 150 in a large size with high resolution, it is desirable to form the projection image 150 using the entire area of the pixel area 12a of the liquid crystal panel 12p as shown in FIG. 6A and FIG. 6B. It should be noted that in the case in which the projection image 150 is projected in a larger size than the size of the screen SC due to the restriction in the distance between the projector 1 and the screen SC or the restriction in size of the screen SC as shown in FIG. 6C, it is possible to reduce the screen size using the simplified size adjustment function.

As shown in FIG. 7A and FIG. 7B, the simplified size adjustment function is a function for setting an image forming area 12e having a rectangular shape smaller in size than the pixel area 12a in the pixel area 12a, and forming the projection image 150 in the image forming area 12e to thereby adjust the screen size. For example, the projector 1 is made capable of adjusting the screen size at a plurality of levels within a range of 0.5 times through 1.0 time. The control section 40 holds a size adjustment value representing the level of the screen size, and when the control section 40 outputs the size adjustment value to the image processing section 31, the image processing section 31 performs a process of changing the screen size in accordance with the size adjustment value thus input.

The operation receiving section 21 and the remote controller 50 of the present embodiment are each provided with a "tele-key" and a "wide-key," and it is possible for the user to change the screen size by operating these keys. When the "tele-key" is operated by the user, the control section 40 changes the size adjustment value so that the screen size becomes one level smaller than in the present, and then outputs the size adjustment value to the image processing section 31. Further, when the "wide-key" is operated by the user, the control section 40 changes the size adjustment value so that the screen size becomes one level larger than in the present, and then outputs the size adjustment value to the image processing section 31. It should be noted that in the case in which the "tele-key" is operated in the state with the smallest screen size, and the case in which the "wide-key" is operated in the state with the largest screen size, the control section 40 keeps the screen size at the time without changing the size adjustment value.

The image processing section 31 sets the image forming area 12e having a size corresponding to the size adjustment value input from the control section 40 in the pixel area 12a, and performs a process for forming the image within the image forming area 12e thus set on the image data input from the image signal input section 30. Specifically, except the case in which the screen size is the largest, the image processing section 31 thereafter thins the image data input from the image signal input section 30 to contract the image in order to form the image within the image forming area 12e thus set. Further, the image processing section 31 sets the color of the area (invalid area 12n) outside the image forming area 12e to black, namely the color minimizing the light transmission rate. As a result, it becomes possible to display the projection image 150 based on the image signal in a size fitting within the range of the screen SC as shown in FIG. 7B. On this occasion, the area 150B outside the projection image 150, namely the area 150B corresponding to the invalid area 12n, is set to black, and is therefore made difficult to be visually recognized by the user.

Figure 8A:
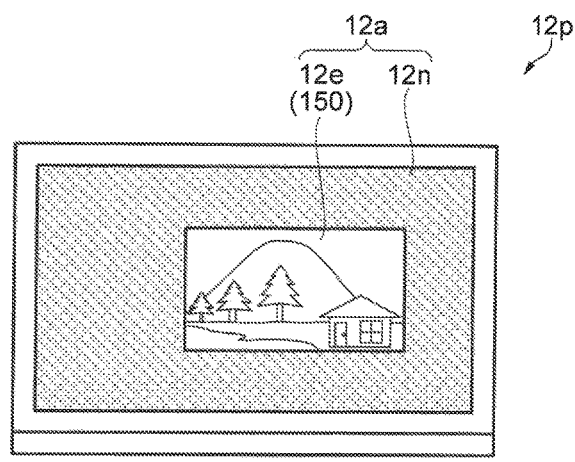
FIG. 8A is an explanatory diagram for explaining a simplified position adjustment function, and a diagram showing the liquid crystal panel.
Figure 8B:
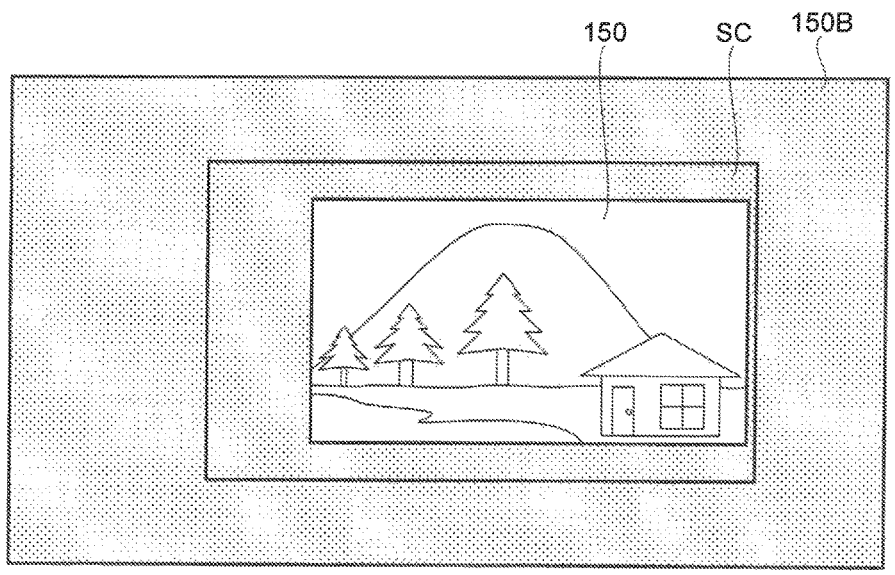
FIG. 8B is an explanatory diagram for explaining the simplified position adjustment function, and a diagram showing a projection image projected on the screen.

FIG. 8A and FIG. 8B are explanatory diagrams for explaining the simplified position adjustment function, wherein FIG. 8A is a diagram showing the liquid crystal panel 12p, and FIG. 8B is a diagram showing the projection image 150 projected on the screen SC.

As shown in FIG. 8A and FIG. 8B, the simplified position adjustment function is a function for adjusting the position of the projection image 150 on the screen SC by changing the position of the image forming area 12e in the pixel area 12a in the case in which the screen size is set to a size other than the largest size by the simplified size adjustment function. The control section 40 holds coordinate information representing the coordinate of a predetermined position (e.g., the center) of the image forming area 12e, and when the control section 40 outputs the coordinate information to the image processing section 31, the image processing section 31 performs a process for changing the position of the image forming area 12e in accordance with the coordinate information thus input.

In the present embodiment, when the user selects a predetermined item in the menu screen, which is displayed in response to holding down the "menu key," the control section 40 makes a position adjusting screen not shown be projected as the OSD image. Then, by holding down the "cursor key" in the state in which the position adjusting screen is displayed, the user can perform the position adjustment of the projection image 150. As shown in FIG. 8A, when the "cursor key" is held down by the user, the control section 40 updates the coordinate information so that the image forming area 12e moves as much as a predetermined moving amount in a direction corresponding to the direction of the "cursor key" having been held down, and then outputs the coordinate information thus updated to the image processing section 31. Then, the image processing section 31 moves the position of the image forming area 12e based on the coordinate information from the control section 40. Specifically, the image processing section 31 sets the image forming area 12e at the position based on the coordinate information thus updated in the pixel area 12a, and performs a process for forming the image within the image forming area 12e thus set on the image data input from the image signal input section 30. As a result, as shown in FIG. 8B, the projection image 150 projected on the screen SC also moves in the direction corresponding to the direction of the "cursor key" having been held down. FIG. 8A and FIG. 8B show the state after the "cursor key" of the right direction is operated by the user in the state shown in FIG. 7A and FIG. 7B. It is possible for the user to continuously move the projection image 150 by continuing to hold down the "cursor key."

As shown in FIG. 1, also in the present embodiment, the control section 40 is provided with the end part extraction section 42, the approach determination section 44, the moving speed changing section 46 and the message generation section 48, as functional sections. The control section 40 has a function of reducing the moving speed at which the projection image 150 moves in the first direction when an inter-end part distance between an end part of the screen SC and an end part of the projection image 150 gets within the first range during the period in which the control section 40 is moving the projection image 150 in the first direction using the simplified position adjustment function.

Similarly to the first embodiment, the end part extraction section 42 analyzes the two-dimensional shot image data obtained by the imaging section 15 by shooting to extract the end parts of the screen SC and the end parts of the projection image 150 projected on the screen SC, and then outputs the position information of the end parts thus extracted to the approach determination section 44.

Similarly to the first embodiment, the approach determination section 44 calculates the inter-end part distance defined by the end part of the screen SC and the end part of the projection image 150 with respect to each of the directions based on the positions of the end parts output by the end part extraction section 42. Further, the approach determination section 44 determines whether or not the inter-end part distance thus calculated is included in the first range, and then determines whether or not the end part of the projection image 150 approaches the end part of the screen SC based on the result of the determination.

The approach determination section 44 outputs the approach information representing the approach between the end part of the projection image 150 and the end part of the screen SC to the moving speed changing section 46 in the case in which the projection image 150 has moved due to the simplified position adjustment function, and the approach determination section 44 has determined that the end part of the projection image 150 has approached the end part of the screen SC.

The moving speed changing section 46 reduces the moving speed at which the projection image 150 moves due to the simplified position adjustment function in the case in which the moving speed changing section 46 has received the approach information output by the approach determination section 44. Specifically, the moving speed changing section 46 makes the moving amount of the image forming area 12e (the projection image 150) in each holding down operation smaller than the moving amount set before receiving the approach information when the moving speed changing section 46 updates the coordinate information in accordance with holding down of the "cursor key." Therefore, in the case of continuing to hold down the "cursor key," since the moving amount per unit time decreases, the moving speed of the projection image 150 decreases.

Similarly to the first embodiment, the moving speed changing section 46 reduces the moving speed of the projection image 150 in the case in which the end part of the screen SC and the end part of the projection image 150 have approached each other within the first range, and further, stops the motion in the case in which the end part of the screen SC and the end part of the projection image 150 overlap each other.

Further, the moving amount set in the case in which the end part of the screen SC and the end part of the projection image 150 have approached each other within the first range can be kept constant until the end part of the screen SC and the end part of the projection image 150 overlap each other, or can gradually be reduced as the inter-end part distance shortens.

The moving speed changing section 46 outputs change information representing the change in speed to the message generation section 48 in the case in which the moving speed of the projection image 150 has been changed.

In the case in which the message generation section 48 has received the change information from the moving speed changing section 46, the message generation section 48 generates a message screen including a message corresponding to the change information, and then transmits the message screen thus generated to the OSD processing section 32 to make the message screen be projected on the screen SC from the image projection section 10 as the OSD image. For example, similarly to the first embodiment, in the case in which it has been determined that the end part of the screen SC and the end part of the projection image 150 overlap each other, the message generation section 48 generates the warning screen 148 for giving a warning that the projection image 150 runs off the screen SC, and then makes the warning screen 148 be projected.

The operation flow of the projector 1 according to the present embodiment is roughly the same as in the first embodiment except the difference in cause of the translation of the projection image 150 on the screen SC due to the lens shift or the simplified position adjustment function, and the description thereof will be omitted. In other words, also in the present embodiment, the control section 40 operates according to the flowchart shown in FIG. 3.

According to the embodiment described hereinabove, substantially the same advantage as in the first embodiment can be obtained also with respect to the simplified position adjustment function. Specifically, while the projector 1 is moving the projection image 150 projected on the screen SC in the first direction based on the operation received by the operation receiving section 21, when the inter-end part distance between the end part of the screen SC and the end part of the projection image 150 extracted by the end part extraction section 42 gets within the first range, the projector 1 reduces the moving speed of the projection image 150. Therefore, in the case in which it is attempted to make the end part of the projection image 150 approach the end part of the screen SC, since the translation operation of the projection image 150 can carefully be performed by reducing the moving speed of the projection image 150, the convenience of the simplified position adjustment function is improved.

It should be noted that also in the present embodiment, the imaging section 15, the shooting control section 28 and the end part extraction section 42 correspond to the detection section for detecting the end parts of the screen SC and the end parts of the projection image 150. Further, in the first embodiment described above, the lens shift adjustment mechanism 133 and the lens shift drive section 26 correspond to the projection image position adjustment section for adjusting the position of the projection image 150 on the screen SC, while in the present embodiment, the image processing section 31 for changing the position of the image forming area 12e, namely the position of the projection image 150, in accordance with the coordinate information input from the control section 40 corresponds to the projection image position adjustment section.

Although the invention is hereinabove described based on the embodiments shown in the drawings, the invention is not limited to the present embodiments, but such modified examples as described below can also be assumed.

(1) The shape of the screen SC is not limited to the rectangular shape. It is also possible to assume the configuration of performing the projection using a wall surface of a building as the screen SC as shown in FIG. 5. In this case, when the projection image 150 moves toward the right part of the screen SC due to the lens shift operation or the simplified position adjustment function, and one vertex P of the projection image 150 has contact with one side L constituting the screen SC, the control section 40 projects the warning screen 148 and at the same time stops the translation of the projection image 150.

(2) The end parts of the screen SC are extracted based on the two-dimensional shot image data obtained by the imaging section 15 by shooting, but this method is not a limitation. For example, it is also possible to extract the end parts of the screen SC with a ranging sensor using a laser beam. Thus, it is possible to accurately detect the end parts even in the case such as an outdoor building wall in which it is difficult to perform the edge detection of the end parts of the screen SC using the image analysis.

Further, the specific installation configuration of each of the functional sections of the control section 40 shown in FIG. 1 is not particularly limited. Therefore, it is not necessarily required to install the hardware corresponding individually to each of the functional sections, but it is obviously possible to adopt a configuration of realizing the functions of the plurality of functional sections by a single processor executing a program. Further, a part of the function realized by software in the embodiment described above can also be realized by hardware, or a part of the function realized by hardware can also be realized by software.

What is claimed is:

1. A projector comprising:
a light source adapted to emit first light;
a modulation section adapted to generate second light obtained by modulating the first light in accordance with an image signal;
a display section having a projection lens, and adapted to let the second light pass through the projection lens to display a projection image on a projection surface;
a detection section adapted to detect an end part of the projection surface and an end part of the projection image;
a position adjustment section adapted to move the projection lens;
an operation receiving section adapted to receive an operation of moving the projection image in a first direction; and
a control section adapted to make the position adjustment section move the projection lens so that the projection image moves in the first direction in a case in which the operation receiving section has received the operation,
wherein the control section reduces a moving speed at which the projection image moves in the first direction when an inter-end part distance between the end part of the projection surface and the end part of the projection image gets within a first range while the control section is moving the projection image in the first direction due to the operation.

2. The projector according to claim 1, wherein
the control section stops the motion of the projection image in a case in which the end part of the projection image and the end part of the projection surface overlap each other while the control section is moving the projection image in the first direction.

3. The projector according to claim 1, wherein
the control section makes the display section display a message screen in a case in which the control section has reduced the moving speed.

4. The projector according to claim 3, wherein
the message screen is provided with a receiver adapted to receive a decision on whether to continue the motion of the projection image even if the projection image runs off the projection surface, and
the control section continues the motion of the projection image toward the first direction based on the operation in a case in which the receiver has received a decision to continue the motion of the projection image.

5. The projector according to claim 1, wherein
the control section makes the position adjustment section move the projection image so that the end part of the projection image and the end part of the projection surface overlap each other in a case in which the operation receiving section has received a predetermined operation.

6. The projector according to claim 1, wherein
the detection section is provided with an imaging section adapted to obtain an image including the projection surface and the projection image by shooting and then output the image, and detects the end part of the projection surface and the end part of the projection image by analyzing the image output by the imaging section.

7. A method of controlling a projector, comprising:
providing a projector including a light source adapted to emit first light, a modulation section adapted to generate second light obtained by modulating the first light in accordance with an image signal, a display section having a projection lens, and adapted to let the second light pass through the projection lens to display a projection image on a projection surface, a detection section adapted to detect an end part of the projection surface and an end part of the projection image, a position adjustment section adapted to move the projection lens, and an operation receiving section adapted to receive an operation of moving the projection image in a first direction;

moving the projection image in the first direction by moving the projection lens based on the operation received by the operation receiving section; and reducing a moving speed at which the projection image moves in the first direction in a case an inter-end part distance between the end part of the projection surface and the end part of the projection image detected by the detection section gets within a first range.

8. A projector comprising:

a light source adapted to emit first light;

a modulation section adapted to generate second light obtained by modulating the first light in accordance with an image signal;

a display section having a projection lens, and adapted to let the second light pass through the projection lens to display a projection image on a projection surface;

a detection section adapted to detect an end part of the projection surface and an end part of the projection image;

a projection image position adjustment section adapted to adjust a position of the projection image on the projection surface;

an operation receiving section adapted to receive an operation of moving the projection image in a first direction; and a control section adapted to make the projection image position adjustment section move the projection image in the first direction in a case in which the operation receiving section has received the operation, wherein the control section reduces a moving speed at which the projection image moves in the first direction when an inter-end part distance between the end part of the projection surface and the end part of the projection image gets within a first range while the control section is moving the projection image in the first direction due to the operation.

9. The projector according to claim 8, wherein the projection image position adjustment section changes a position at which the projection image is formed in the modulation section.

\* \* \* \* \*